(12) United States Patent
Yoo et al.

(10) Patent No.: US 12,260,043 B2
(45) Date of Patent: Mar. 25, 2025

(54) ELECTRONIC DEVICE AND METHOD OF DRIVING THE SAME

(71) Applicant: SAMSUNG DISPLAY CO., LTD., Yongin-si (KR)

(72) Inventors: Byung Han Yoo, Yongin-si (KR); Jung Woo Park, Yongin-si (KR); Hyang A Park, Yongin-si (KR); Dae Young Lee, Yongin-si (KR); Hyun Dae Lee, Yongin-si (KR); Kang Bin Jo, Yongin-si (KR); Sang Hwan Cho, Yongin-si (KR); Sung-Chan Jo, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/463,400

(22) Filed: Sep. 8, 2023

(65) Prior Publication Data

US 2024/0134478 A1 Apr. 25, 2024
US 2024/0231534 A9 Jul. 11, 2024

(30) Foreign Application Priority Data

Oct. 21, 2022 (KR) .................. 10-2022-0136677
Feb. 27, 2023 (KR) .................. 10-2023-0026276

(51) Int. Cl.
*G06F 21/32* (2013.01)
*G06F 3/041* (2006.01)
(Continued)

(52) U.S. Cl.
CPC ...... *G06F 3/04166* (2019.05); *G06F 3/04817* (2013.01); *G06F 3/0488* (2013.01);
(Continued)

(58) Field of Classification Search
CPC . G06F 21/36; G06V 40/1365; G06V 40/1306
See application file for complete search history.

(56) References Cited

U.S. PATENT DOCUMENTS 8,443,199 B2 5/2013 Kim et al.
8,601,009 B2 12/2013 Yamazaki
(Continued)

FOREIGN PATENT DOCUMENTS

JP 4727065 4/2011
KR 10-1549556 9/2015
(Continued)

*Primary Examiner* — Kevin M Nguyen
(74) *Attorney, Agent, or Firm* — F. Chau & Associates, LLC

(57) ABSTRACT

A method of driving an electronic device includes displaying a plurality of fingerprint recognition icons on a display device configured to perform fingerprint recognition, and releasing a lock state of the display device through a fingerprint authentication process upon determining at least one first fingerprint recognition icon among the plurality of fingerprint recognition icons is touched. The plurality of fingerprint recognition icons include at least one first fingerprint recognition icon configured to support the fingerprint recognition and at least one second fingerprint recognition icon configured to not support the fingerprint recognition.

20 Claims, 16 Drawing Sheets

302: 302a, 302b

(51) Int. Cl.
*G06F 3/04817* (2022.01)
*G06F 3/0488* (2022.01)
*G06Q 20/10* (2012.01)
*G06Q 20/40* (2012.01)
*G06V 40/12* (2022.01)
*G06V 40/13* (2022.01)

(52) U.S. Cl.
CPC ........... *G06F 21/32* (2013.01); *G06Q 20/108* (2013.01); *G06Q 20/40145* (2013.01); *G06V 40/1306* (2022.01); *G06V 40/1365* (2022.01); *G06F 2203/04104* (2013.01)

(56) References Cited

U.S. PATENT DOCUMENTS

| | | | |
|---|---|---|---|
| 8,745,490 B2 | 6/2014 | Kim | |
| 10,764,280 B2 | 9/2020 | Kim et al. | |
| 2017/0109727 A1* | 4/2017 | Han | G06Q 20/3674 |
| 2019/0164156 A1* | 5/2019 | Lindemann | G06Q 20/4016 |
| 2020/0356754 A1* | 11/2020 | Chen | G06N 20/00 |
| 2021/0409539 A1* | 12/2021 | Arellano | G06F 1/1684 |

FOREIGN PATENT DOCUMENTS

| | | |
|---|---|---|
| KR | 10-1549558 | 9/2015 |
| KR | 10-2387568 | 4/2022 |

* cited by examiner

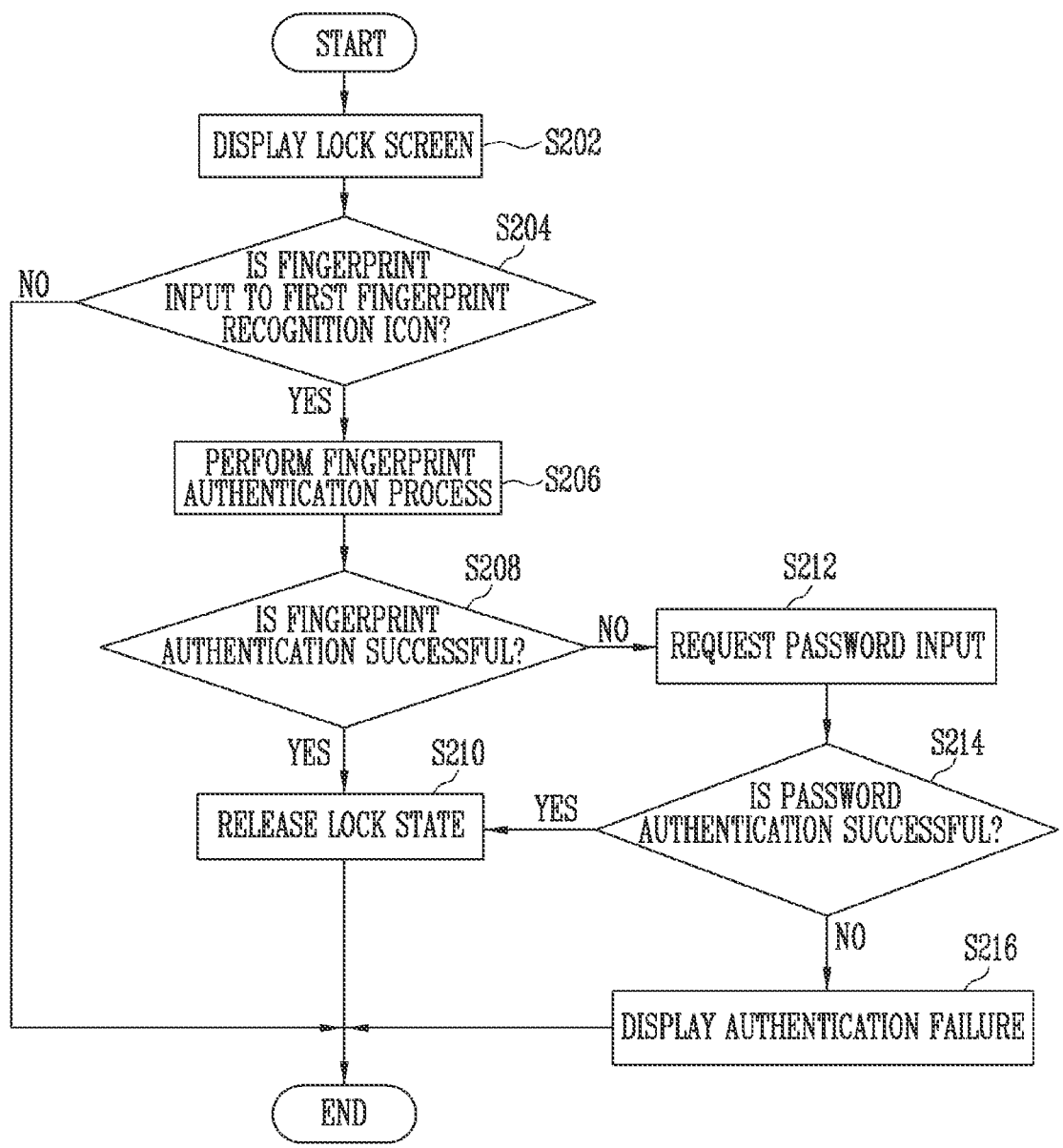

302: 302a, 302b

302: 302a, 302b

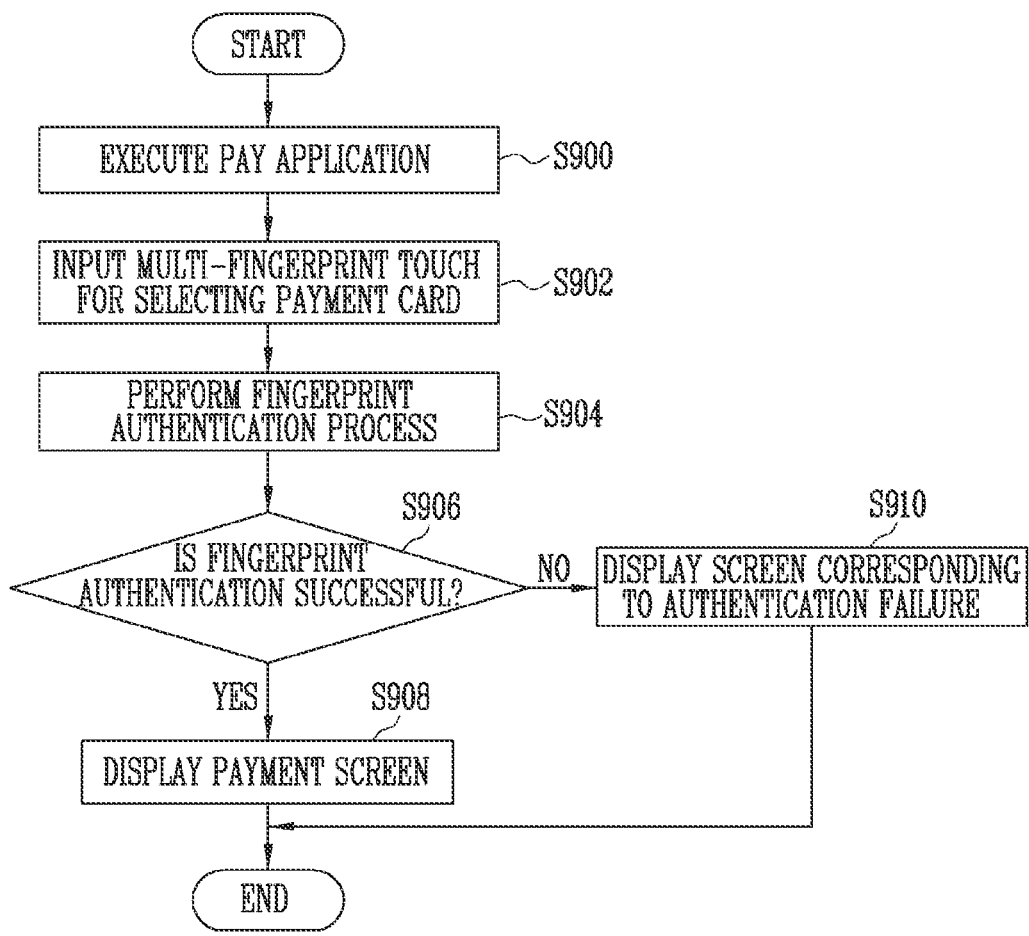

ELECTRONIC DEVICE AND METHOD OF DRIVING THE SAME

CROSS-REFERENCE TO RELATED APPLICATIONS

This U.S. patent application claims priority under 35 U.S.C. § 119 to Korean Patent Application No. 10-2022-0136677, filed on Oct. 21, 2022 and Korean Patent Application No. 10-2023-0026276, filed on Feb. 27, 2023, the disclosures of which are incorporated by reference in their entirety herein.

1. TECHNICAL FIELD

The disclosure relates to an electronic device and a method of driving the same.

2. DISCUSSION OF RELATED ART

Portable electronic devices such as smart phones provide various functions. The electronic device may include a user interface (UI) for enabling users to easily and conveniently search for or select one or more functions. In the interests of security, it may be necessary to prevent certain users from accessing some of the functions (e.g., the secure functions). However, if an authorized user gains access to the electronic device and presents the UI, individuals other than the authorized may select the secure functions from the presented UI. Thus, there is a need for methods and system for enabling users to access various functions while maintaining security.

SUMMARY

Methods and system for enabling users to access various functions while maintaining security may be provided by busing a multi-fingerprint touch in which two or more fingerprint touches are simultaneously input.

According to an embodiment of the disclosure, a method of driving an electronic device includes displaying a plurality of fingerprint recognition icons on a display device configured to perform fingerprint recognition, and releasing a lock state of the display device through a fingerprint authentication process upon determining that at least one first fingerprint recognition icon among the plurality of fingerprint recognition icons is touched. The plurality of fingerprint recognition icons include at least one first fingerprint recognition icon supporting fingerprint recognition and at least one second fingerprint recognition icon not supporting the fingerprint recognition.

According to an embodiment, the method further includes receiving a password to release the lock state when the fingerprint is not authenticated during the fingerprint authentication process.

According to an embodiment, the releasing includes releasing the lock state when a multi-fingerprint touch in which two or more of the first fingerprint recognition icons are simultaneously selected is input.

According to an embodiment, the method further includes displaying application icons on the display device, receiving a multi-fingerprint touch including a first fingerprint touch input for selecting one of the application icons and a second fingerprint touch input for selecting a background screen of the display device, and determining whether fingerprint information input from at least one of the first fingerprint touch input and the second fingerprint touch input is authentic and then executing an application of the application icon selected by the first fingerprint touch input when the fingerprint information is determined to be authentic.

According to an embodiment, the method further includes receiving a password to execute the application of the selected application icon when the fingerprint information is not authenticated.

According to an embodiment, the method further includes executing a pay application, receiving a multi-fingerprint touch including a first fingerprint touch input for selecting one of a plurality of cards included in the pay application and a second fingerprint touch input for selecting a background screen of the display device, and determining whether fingerprint information input from at least one of the first fingerprint touch input and the second fingerprint touch input is authentic and using the selected card for performing a purchase.

According to an embodiment, the using of the selected card for performing the purchase occurs without an additional authentication step.

According to an embodiment, the method further includes executing a banking application, receiving a transfer amount, determining an authentic condition among a plurality of different authentication conditions in response to the transfer amount, receiving fingerprint information in response to the authentication condition, determining whether the fingerprint information is authentic and remitting the transfer amount when it is determined that the fingerprint information is authentic.

According to an embodiment, a number of fingerprints to be used for the fingerprint authentication increases in response to an increase of the transfer amount.

According to an embodiment, the fingerprint information is input as a multi-fingerprint touch in which a plurality of fingers are simultaneously touched.

According to an embodiment, the method further includes executing a gallery application for displaying a current image on the display device, receiving a multi-fingerprint touch including a first fingerprint touch input and a second fingerprint touch input, determining whether fingerprint information input from at least one of the first fingerprint touch input and the second fingerprint touch input is authentic and displaying a next image on the display device when the fingerprint information is determined to be authentic.

According to an embodiment, the method further includes maintaining current image displayed on the display device when the multi-fingerprint touch is not input.

According to an embodiment, the method further includes maintaining the current image displayed on the display device when the fingerprint information is not authenticated.

According to an embodiment of the disclosure, an electronic device includes a fingerprint sensor for sensing a fingerprint when a display device is touched, and a processor for displaying a plurality of fingerprint recognition icons on a lock screen of the display device and releasing a lock state of the lock screen through a fingerprint authentication process when at least one first fingerprint recognition icon among the plurality of fingerprint recognition icons is touched. The plurality of fingerprint recognition icons include the at least one first fingerprint recognition icon supporting fingerprint recognition and at least one second fingerprint recognition icon not supporting the fingerprint recognition.

According to an embodiment, after the lock state of the lock screen is released, a plurality of application icons are displayed on the display device, and when a multi-fingerprint touch including a first fingerprint touch input for selecting one of the application icons and a second fingerprint touch input for selecting a background screen of the display device is input, the processor authenticates fingerprint information input from at least one of the first fingerprint touch input and the second fingerprint touch input and then executes the application icon selected by the first fingerprint touch input.

According to an embodiment, when a multi-fingerprint touch including a first fingerprint touch input for selecting one of a plurality of cards and a second fingerprint touch input for selecting a background screen of the display device is input after a pay application is executed, the processor authenticates fingerprint information input from at least one of the first fingerprint touch input and the second fingerprint touch input and uses a card selected by the first fingerprint touch input to perform a purchase.

According to an embodiment, the processor performs the purchase using the selected card without an additional authentication process.

According to an embodiment, the processor applies different authentication conditions according to a transfer amount when a banking application is executed.

According to an embodiment, the processor performs the authentication process using fingerprint information of a first number of fingers when the transfer amount is a first value and using the fingerprint information of a second number of fingers larger than the first number when the transfer amount is a second value larger than the first value.

According to an embodiment, the processor authenticates fingerprint information and then displays a next image only when a multi-fingerprint touch including a first fingerprint touch input and a second fingerprint touch input is input after a gallery application is executed and a next image is displayed on the display device.

In accordance with the electronic device and the method of driving the same according to an embodiment of the disclosure, security may be increased by enabling fingerprint recognition of only a preset portion of the plurality of fingerprint recognition icons displayed on the lock screen.

In addition, in accordance with the electronic device and the method of driving the same according to an embodiment of the disclosure, an application may be selected using the multi-fingerprint touch and an operation of the selected application may be controlled. For example, in an embodiment of the disclosure, the pay application, the banking application, the gallery application, and the like may be controlled using the multi-fingerprint touch, and thus security may be increased.

BRIEF DESCRIPTION OF THE DRAWINGS

The above and other features of the disclosure will become more apparent by describing in further detail embodiments thereof with reference to the accompanying drawings, in which:

FIG. 2 is a flowchart illustrating a lock screen release method according to an embodiment of the disclosure;

FIG. 9 is a flowchart illustrating an embodiment of a pay application execution process using the multi-fingerprint touch;

DETAILED DESCRIPTION OF THE EMBODIMENTS

Figure 1:
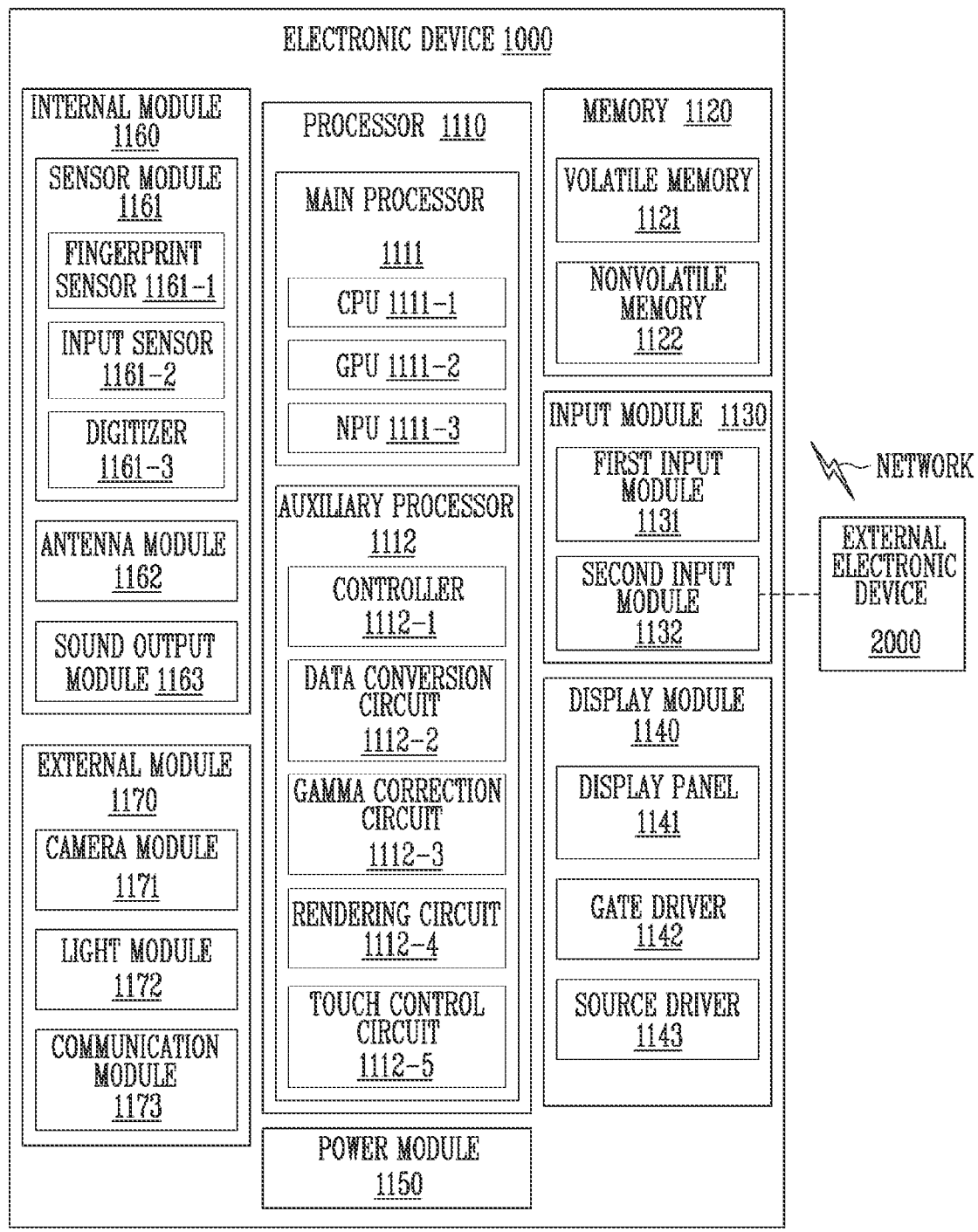
FIG. 1 is a diagram illustrating an electronic device according to an embodiment of the disclosure.

Hereinafter, the disclosure will be described in detail with reference to the accompanying drawings so that those skilled in the art may carry out embodiments thereof. However, the disclosure may be implemented in various different forms and is not limited to the embodiments described herein.

In order to clearly describe the disclosure, parts that are not related to the description may be omitted, and the same or similar elements are denoted by the same reference numerals throughout the specification. Therefore, the reference numerals described herein may be used in other drawings.

In addition, an expression "is the same" in the description may mean "is substantially the same". That is, the expression "is the same" may be the same enough for those of ordinary skill to understand that it is the same. Other expressions may also be expressions in which "substantially" is omitted.

Some embodiments may be described in the accompanying drawings in relation to functional block, unit, and/or module. Those skilled in the art will understand that such block, unit, and/or module may be physically implemented by a logic circuit, an individual component, a microprocessor, a hard wire circuit, a memory element, a line connection, or other electronic circuits. This may be formed using a semiconductor-based manufacturing technique or other manufacturing techniques. The block, unit, and/or module implemented by a microprocessor or other similar hardware may be programmed and controlled using software to perform various functions discussed herein and optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interactive individual blocks, units, and/or modules without departing from the scope of the inventive concept. In addition, in some embodiments, the block, unit and/or module may be physically combined into more complex blocks, units, and/or modules without departing from the scope of the inventive concept.

A term "connection" between two configurations may mean that both of an electrical connection and a physical connection are used inclusively, but is not limited thereto. For example, "connection" used based on a circuit diagram may mean an electrical connection, and "connection" used based on a cross-sectional view and a plan view may mean a physical connection.

Although a first, a second, and the like are used to describe various components, these components are not limited by these terms. These terms are used only to distinguish one component from another component. Therefore, a first component described below may be a second component within the technical spirit of the disclosure. The singular expression includes the plural expression unless the context clearly dictates otherwise.

Meanwhile, the disclosure is not limited to the embodiments disclosed below, and may be modified in various forms and may be implemented. In addition, each of the embodiments disclosed below may be implemented alone or in combination with at least one of other embodiments.

FIG. 1 is a diagram illustrating an electronic device according to an embodiment of the disclosure.

Referring to FIG. 1, the electronic device 1000 outputs various pieces of information through a display module 1140. For example, the display module 1140 may be a display device of a mobile device such as a smartphone, a tablet, or a laptop or another device such as a monitor of a desktop computer. When a processor 1110 executes an application stored in a memory 1120, the display module 1140 provides application information to a user through a display panel 1141.

The processor 1110 obtains an external input through an input module 1130 (e.g., an input device) or a sensor module 1161 (e.g., a sensor device) and executes an application corresponding to the external input. For example, when the user selects a camera icon (or a camera application icon) displayed on the display panel 1141, the processor 1110 obtains a user input through an input sensor 1161-2 and activates a camera module 1171 (e.g., a camera or an application for the camera). The processor 1110 transmits image data corresponding to a captured image obtained through the camera module 1171 to the display module 1140. The display module 1140 may display an image corresponding to the captured image through the display panel 1141.

As another example, when personal information authentication is executed in the display module 1140, a fingerprint sensor 1161-1 obtains input fingerprint information as input data. For example, when a user places a finger on the display panel 1141, the fingerprint sensor 1161-1 may sense the finger to generate the fingerprint information. The processor 1110 compares input data obtained through the fingerprint sensor 1161-1 with authentication data stored in a memory 1120 and executes an application according to a comparison result. For example, the processor 1110 may compare the sensed fingerprint information with known fingerprint information to determine whether an authorized user placed a finger on the display panel 1141. The display module 1140 may display information executed according to logic of an application through the display panel 1141. The fingerprint sensor 1161-1 may be disposed to obtain the fingerprint information from the entire area of the display module 1140 (or the display panel 1141).

In another example, when a music streaming icon displayed on the display module 1140 is selected, the processor 1110 obtains a user input through the input sensor 1161-2 and activates a music streaming application stored in the memory 1120. When a music execution command is input in the music streaming application, the processor 1110 activates a sound output module 1163 (e.g., a speaker) to provide sound information corresponding to the music execution command to the user.

In the above, an operation of the electronic device 1000 is briefly described. Hereinafter, a configuration of the electronic device 1000 is described in detail. Some of configurations of the electronic device 1000 to be described later may be integrated and provided as one configuration, and one configuration may be separated into two or more configurations and provided.

The electronic device 1000 may communicate with an external electronic device 2000 through a network (for example, a short-range wireless communication network or a long-range wireless communication network). According to an embodiment, the electronic device 1000 may include a processor 1110, a memory 1120, an input module 1130, a display module 1140, a power module 1150 (e.g., a power supply), an internal module 1160 (e.g., an internal device), and an external module 1170 (e.g., an external device). According to an embodiment, in the electronic device 1000, at least one of the above-described components may be omitted or one or more other components may be added. According to an embodiment, some of the above-described components (for example, the sensor module 1161, an antenna module 1162, or the sound output module 1163) may be integrated into another component (for example, the display module 1140).

The processor 1110 may execute software to control at least another component (for example, a hardware or software component) of the electronic device 1000 connected to the processor 1110, and perform various data processing or operations. According to an embodiment, as at least a portion of the data processing or operation, the processor 1110 may store a command or data received from another component (for example, the input module 1130, the sensor module 1161, or a communication module 1173) in a volatile memory 1121, process the command or the data stored in the volatile memory 1121, and store result data in a nonvolatile memory 1122.

The processor 1110 may include a main processor 1111 and an auxiliary processor 1112. The main processor 1111 may include one or more of a central processing unit (CPU) 1111-1 or an application processor (AP). The main processor 1111 may further include any one or more of a graphic processing unit (GPU) 1111-2, a communication processor (CP), and an image signal processor (ISP). The main processor 1111 may further include a neural processing unit (NPU) 1111-3. The NPU 1111-3 is a processor specialized in processing an artificial intelligence model. The artificial intelligence model may be generated through machine learning. The artificial intelligence model may include a plurality of artificial neural network layers. The artificial neural network may be one of a deep neural network (DNN), a convolutional neural network (CNN), a recurrent neural network (RNN), a restricted boltzmann machine (RBM), a deep belief network (DBN), a bidirectional recurrent deep neural network (BRDNN), a deep Q-network, or a combination of two or more of the above, but is not limited to the above-described example. Additionally or alternatively, the artificial intelligence model may include a software structure in addition to a hardware structure. At least two of the above-described processing units and processors may be implemented as one integrated configuration (for example, a single chip), or each may be implemented as an independent configuration (for example, a plurality of chips).

The auxiliary processor 1112 may include a controller 1112-1 (e.g., a controller circuit). The controller 1112-1 may include an interface conversion circuit and a timing control circuit. The controller 1112-1 receives an image signal from the main processor 1111, converts a data format of the image signal to correspond to an interface specification supported by the display module 1140 to generate image data, and outputs image data. The controller 1112-1 may output various control signals necessary for driving the display module 1140.

The auxiliary processor 1112 may further include a data conversion circuit 1112-2, a gamma correction circuit 1112-3, a rendering circuit 1112-4, a touch control circuit 1112-5, and the like. The data conversion circuit 1112-2 may receive the image data from the controller 1112-1, compensate the image data to display an image with a desired luminance according to a characteristic of the electronic device 1000, a setting of the user, or the like, or convert the image data for reduction of power consumption, afterimage compensation, or the like.

The gamma correction circuit 1112-3 may convert the image data, a gamma reference voltage, or the like so that the image displayed on the electronic device 1000 has a desired gamma characteristic. The rendering circuit 1112-4 may receive the image data from the controller 1112-1 and render the image data in consideration of a pixel disposition or the like of the display panel 1141 applied to the electronic device 1000.

The touch control circuit 1112-5 may supply a touch signal to the input sensor 1161-2 and receive a sensing signal from the input sensor 1161-2 in response to the touch signal.

At least one of the data conversion circuit 1112-2, the gamma correction circuit 1112-3, the rendering circuit 1112-4, and the touch control circuit 1112-5 may be integrated into another component (for example, the main processor 1111 or the controller 1112-1). At least one of the data conversion circuit 1112-2, the gamma correction circuit 1112-3, and the rendering circuit 1112-4 may be integrated into a source driver 1143 to be described later.

The memory 1120 may store various data used by at least one component (for example, the processor 1110 or the sensor module 1161) of the electronic device 1000, and input data or output data for a command related thereto. In addition, various setting data corresponding to a setting of the user may be stored in the memory 1120. The memory 1120 may include at least one of the volatile memory 1121 and the nonvolatile memory 1122.

The input module 1130 may receive a command or data to be used by a component (for example, the processor 1110, the sensor module 1161, or the sound output module 1163) of the electronic device 1000 from outside (for example, the user or the external electronic device 2000) of the electronic device 1000.

The input module 1130 may include a first input module 1131 to which a command or data is input from the user and a second input module 1132 to which a command or data is input from the external electronic device 2000. The first input module 1131 may include a microphone, a mouse, a keyboard, a key (for example, a button), or a pen (for example, a passive pen or an active pen). The second input module 1132 may support a designated protocol capable of connecting to the external electronic device 2000 by wire or wirelessly. According to an embodiment, the second input module 1132 may include a high definition multimedia interface (HDMI), a universal serial bus (USB) interface, a secure digital (SD) card interface, or an audio interface. The second input module 1132 may include a connector capable of physically connecting to the external electronic device 2000, for example, an HDMI connector, a USB connector, an SD card connector, or an audio connector (for example, a headphone connector).

The display module 1140 visually provides information to the user. The display module 1140 may include the display panel 1141, a gate driver 1142, and the source driver 1143. The display module 1140 may further include a window, a chassis, and a bracket for protecting the display panel 1141.

The display panel 1141 (or a display) may include a liquid crystal display panel, an organic light emitting display panel, or an inorganic light emitting display panel, but a type of the display panel 1141 is not limited thereto. The display panel 1141 may be a rigid type or a flexible type that may be rolled or folded. The display module 1140 may further include a supporter, a bracket, a heat dissipation member, or the like that supports the display panel 1141.

The gate driver 1142 may be mounted on the display panel 1141 as a driving chip. In addition, the gate driver 1142 may be integrated in the display panel 1141. For example, the gate driver 1142 may include an amorphous silicon TFT gate driver circuit (ASG), a low temperature polycrystalline silicon (LTPS) TFT gate driver circuit, or an oxide semiconductor TFT gate driver circuit (OSG) built in the display panel 1141. The gate driver 1142 receives a control signal from the controller 1112-1 and outputs scan signals to the display panel 1141 in response to the control signal.

The display module 1140 may further include an emission driver (e.g., an emission driver circuit). The emission driver outputs an emission control signal to the display panel 1141 in response to the control signal received from the controller 1112-1. The emission driver may be formed separately from the gate driver 1142 or may be integrated into the gate driver 1142.

The source driver 1143 receives a control signal from the controller 1112-1, converts image data into an analog voltage (for example, a data signal) in response to the control signal, and then outputs the data signals to the display panel 1141.

The source driver 1143 may be integrated into another component (for example, the controller 1112-1). A function of the interface conversion circuit and the timing control circuit of the controller 1112-1 described above may be integrated into the source driver 1143.

The display module 1140 may further include a voltage generation circuit. The voltage generation circuit may output various voltages necessary for driving the display panel 1141. In an embodiment, the display panel 1141 may include a plurality of pixel columns each including a plurality of pixels.

In an embodiment, the source driver 1143 may convert data corresponding to red (R), green (G), and blue (B) included in the image data received from the processor into a red data signal (or data voltage), a green data signal, and the blue data signal. The source driver 1143 may provide the red data signal, the green data signal, and the blue data signal to the plurality of pixel columns included in the display panel 1141 during one horizontal period.

The power module 1150 supplies power to a component of the electronic device 1000. The power module 1150 may include a battery that charges a power voltage. The battery may include a non-rechargeable primary cell, and a rechargeable secondary cell or fuel cell. The power module 1150 may include a power management integrated circuit (PMIC). The PMIC may supply optimized power to each of the above-described modules and a module to be described later. The power module 1150 may include a wireless power transmission/reception member electrically connected to the battery. The wireless power transmission/reception member may include a plurality of antenna radiators of a coil form.

The electronic device 1000 may further include the internal module 1160 and the external module 1170. The internal module 1160 may include the sensor module 1161, the antenna module 1162, and the sound output module 1163. The external module 1170 may include the camera module 1171, a light module 1172 (e.g., a light source), and the communication module 1173 (e.g., a transceiver).

The sensor module 1161 may sense an input by a body of the user or an input by a pen among the first input module 1131, and may generate an electrical signal or a data value corresponding to the input. The sensor module 1161 may include at least one of a fingerprint sensor 1161-1, an input sensor 1161-2, and a digitizer 1161-3.

The fingerprint sensor 1161-1 may generate a data value corresponding to a fingerprint of the user. The fingerprint sensor 1161-1 may include any one of an optical type fingerprint sensor or a capacitive type fingerprint sensor.

The input sensor 1161-2 may generate a data value corresponding to coordinate information of the input by the body of the user or the pen. The input sensor 1161-2 may calculate a capacitance change amount due the input and generate the data value based on the capacitance change amount. The input sensor 1161-2 may sense an input by the passive pen or may transmit/receive data to and from the active pen.

The input sensor 1161-2 may measure a biometric signal such as blood pressure, water, or body fat. For example, when the user touches a sensor layer or a sensing panel with a body part and does not move during a certain time, the input sensor 1161-2 may sense the biometric signal based on a change of an electric field by the body part and output information desired by the user to the display module 1140 based on the sensed biometric signal.

The digitizer 1161-3 may generate a data value corresponding to coordinate information of the input by the pen. The digitizer 1161-3 generates an electromagnetic change amount by the input as the data value. The digitizer 1161-3 may sense the input by the passive pen or may transmit/receive data to and from the active pen.

At least one of the fingerprint sensor 1161-1, the input sensor 1161-2, and the digitizer 1161-3 may be implemented as a sensor layer formed on the display panel 1141. The sensor layer may be formed using a continuous process. At least one of the fingerprint sensor 1161-1, the input sensor 1161-2, and the digitizer 1161-3 may be disposed above the display panel 1141. Any one of the fingerprint sensor 1161-1, the input sensor 1161-2, and the digitizer 1161-3, for example, the digitizer 1161-3 may be disposed below the display panel 1141.

At least two of the fingerprint sensor 1161-1, the input sensor 1161-2, and the digitizer 1161-3 may be formed to be integrated into one sensing panel through the same process. When at least two of the fingerprint sensor 1161-1, the input sensor 1161-2, and the digitizer 1161-3 are integrated into one sensing panel, the sensing panel may be disposed between the display panel 1141 and a window disposed above the display panel 1141. According to an embodiment, the sensing panel is disposed on the window, but a position of the sensing panel is not limited thereto.

At least one of the fingerprint sensor 1161-1, the input sensor 1161-2, and the digitizer 1161-3 may be embedded in the display panel 1141. That is, at least one of the fingerprint sensor 1161-1, the input sensor 1161-2, and the digitizer 1161-3 may be simultaneously formed through a process of forming elements (for example, a light emitting element, a transistor, and the like) included in the display panel 1141.

In addition, the sensor module 1161 may generate an electrical signal or a data value corresponding to an internal state or an external state of the electronic device 1000. The sensor module 1161 may further include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The antenna module 1162 may include one or more antennas for transmitting a signal or power to the outside or receiving a signal or power from the outside. According to an embodiment, the communication module 1173 may transmit a signal to an external electronic device or receive a signal from an external electronic device through an antenna suitable for a communication method. An antenna pattern of the antenna module 1162 may be integrated into one configuration (for example, the display panel 1141) of the display module 1140 or the input sensor 1161-2.

The sound output module 1163 is a device for outputting a sound signal to an outside of the electronic device 1000, and may include, for example, a speaker used for general purposes such as multimedia playback or recording playback, and a receiver used for receiving a call. According to an embodiment, the receiver may be formed integrally with or separately from the speaker. A sound output pattern of the sound output module 1163 may be integrated into the display module 1140.

The camera module 1171 may capture a still image and a moving image. According to an embodiment, the camera module 1171 may include one or more lenses, an image sensor, or an image signal processor. The camera module 1171 may further include an infrared camera capable of measuring presence or absence of the user, a position of the user, a gaze of the user, and the like.

The light module 1172 may provide light. The light module 1172 may include a light emitting diode or a xenon lamp. The light module 1172 may operate in conjunction with the camera module 1171 or may operate independently.

The communication module 1173 may support establishment of a wired or wireless communication channel between the electronic device 1000 and the external electronic device 2000 and communication performance through the established communication channel. The communication module 1173 may include any one or both of a wireless communication module such as a cellular communication module, a short-range wireless communication module, or a global navigation satellite system (GNSS) communication module, and a wired communication module such as a local area network (LAN) communication module or a power line communication module. The communication module 1173 may communicate with the external electronic device 2000 through a short-range communication network such as Bluetooth, WiFi direct, or infrared data association (IrDA), or a long-range communication network such as a cellular network, the Internet, or a computer network (for example, LAN or WAN). The above-described various types of communication modules 1173 may be implemented as a single chip or as separate chips.

The input module 1130, the sensor module 1161, the camera module 1171, and the like may be used to control an operation of the display module 1140 in conjunction with the processor 1110.

The processor 1110 outputs a command or data to the display module 1140, the sound output module 1163, the camera module 1171, or the light module 1172 based on input data received from the input module 1130. For example, the processor 1110 may generate image data in response to the input data applied through a mouse, an active pen, or the like and output the image data to the display module 1140. The processor 1110 generate command data in response to the input data and output the command data to the camera module 1171 or the light module 1172. When the input data is not received from the input module 1130, the processor 1110 may set an operation mode of the electronic device 1000 to a low power mode or a sleep mode to reduce power consumed by the electronic device 1000.

The processor 1110 may output a command or data to the display module 1140, the sound output module 1163, the camera module 1171, or the light module 1172 based on sensing data received from the sensor module 1161. For example, the processor 1110 may compare authentication data sensed by the fingerprint sensor 1161-1 with authentication data stored in the memory 1120 to generate a comparison result and then execute an application according to the comparison result. The processor 1110 may execute the command based on sensing data sensed by the input sensor 1161-2 or the digitizer 1161-3 or output corresponding image data to the display module 1140. When the sensor module 1161 includes a temperature sensor, the processor 1110 may receive temperature data for a measured temperature from the sensor module 1161 and further perform luminance correction or the like on the image data based on the temperature data.

The processor 1110 may receive measurement data for the presence of the user, the position of the user, the gaze of the user, and the like, from the camera module 1171. The processor 1110 may further perform luminance correction or the like on the image data based on the measurement data. For example, the processor 1110 determining the presence or absence of the user through an input from the camera module 1171 may output image data of which a luminance is corrected through the data conversion circuit 1112-2 or the gamma correction circuit 1112-3 to the display module 1140.

Some of the above-described components may be connected to each other through a communication method between peripheral devices, for example, a bus, general purpose input/output (GPIO), a serial peripheral interface (SPI), a mobile industry processor interface (MIPI), or an ultra path interconnect (UPI) link to exchange a signal (for example, a command or data) with each other. The processor 1110 may communicate with the display module 1140 through a mutually agreed interface. For example, the processor 1110 may use any one of the above-described communication methods, but is not limited to the above-described communication method.

The electronic device 1000 according to various embodiments disclosed in the present document may be one of various types of devices. The electronic device 1000 may be, for example, a portable communication device (for example, a smart phone).

FIG. 2 is a flowchart illustrating a lock screen release method according to an embodiment of the disclosure.

Figure 3A:
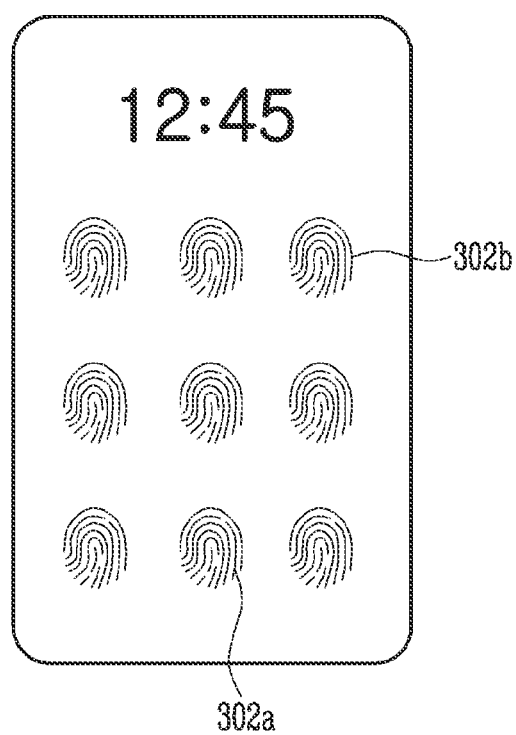
FIGS. 3A to 3C are diagrams illustrating an embodiment of an image displayed on a display module in correspondence with the flowchart of FIG. 2.
Figure 3B:
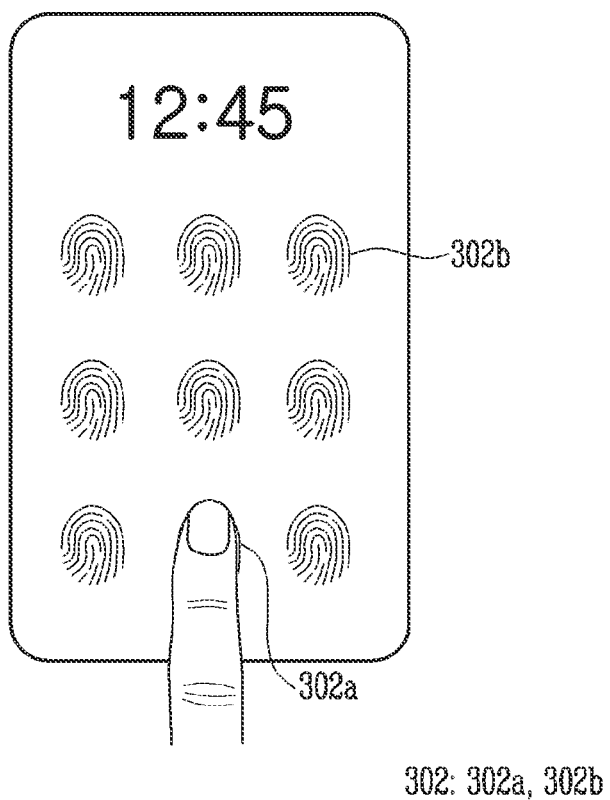
Figure 3C:
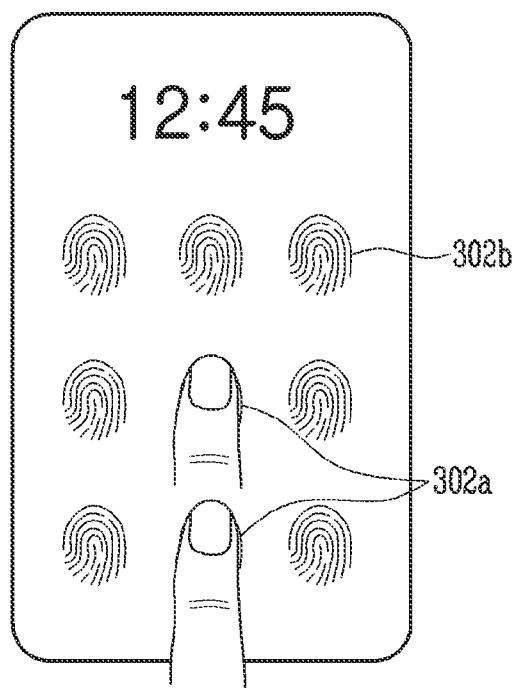

FIGS. 3A to 3C are diagrams illustrating an embodiment of an image displayed on a display module in correspondence with the flowchart of FIG. 2.

Referring to FIG. 2, when the electronic device 1000 is not used, the processor 1110 sets a lock state in which no operation is performed with respect to a general touch input or key input. For example, the lock state may be set after the electronic device 1000 is initially powered on or after the electronic 1000 has not been used for a certain period of time. In an embodiment, the electronic device 1000 does not perform an operation that requires authorization during the lock state in response to a touch input, but may perform an operation that is used to sense a touch or a fingerprint. In the lock state, the processor 1110 may display a lock screen including a plurality of fingerprint recognition icons 302 on the display module 1140 as shown in FIG. 3A (S202).

The fingerprint recognition icons 302 may include one or more first fingerprint recognition icons 302a corresponding to an area where a fingerprint is sensed in response to a touch input, and a second fingerprint recognition icon 302b corresponding to an area where the fingerprint is not sensed regardless of a touch. For example, the processor 1110 may ignore fingers touched to the fingerprint recognition icon 302b or presume that any fingerprint received from a touch of the fingerprint recognition icon 302b is not authorized or not authentic. In an embodiment, the processor 1110 performs a fingerprint authentication process when the touch is input to the first fingerprint recognition icon 302a, and does not perform the fingerprint authentication process when the touch is input to the second fingerprint recognition icon 302b.

A position of the first fingerprint recognition icon 302a and the second fingerprint recognition icon 302b may be previously set by the user, and set information may be stored in the memory 1120. For example, the user could set the information to indicate which positions correspond to first fingerprint recognition icons 302a and which positions correspond to second fingerprint recognition icons 302b.

The processor 1110 determines whether the touch is input to the first fingerprint recognition icon 302a among the fingerprint recognition icons 302 displayed on the lock screen (S204). In step S204, when the touch is not input to the first fingerprint recognition icon 302a, for example, when the touch is input to the second fingerprint recognition icon 302b, the fingerprint authentication process may be ended.

In step S204, when the touch is input to the first fingerprint recognition icon 302a as shown in FIG. 3B (that is, when a finger of the user touches the first fingerprint recognition icon 302a), the processor 1110 performs the fingerprint authentication process (S206). For example, in step S206, the processor 1110 may determine whether fingerprint information input from the first fingerprint recognition icon 302a matches the fingerprint information stored in the memory 1120.

The fingerprint information stored in the memory 1120 may be stored in a form of at least one of fingerprint information for each finger of user, fingerprint information for each user, and fingerprint information according to a fingerprint recognition pattern. That is, the fingerprint information may be stored for each finger, such as a thumb, an index finger, a middle finger, a ring finger, and a little finger of the same user. In addition, the fingerprint information may be stored as fingerprint information of a first user, fingerprint information of a second user, and the like. In addition, different fingerprint recognition patterns may be stored according to a fingerprint recognition area, a contact intensity, or the like with respect to a fingerprint of the same finger.

When it is determined that the fingerprint information input from the first fingerprint recognition icon 302a matches the fingerprint information stored in the memory 1120 (S208), the processor 1110 may release the lock state of the electronic device 1000 without a request of a password (S210). When the lock state is released, the processor 1110 may generate a screen, a sound effect, a vibration, or the like to indicate the lock state is released.

When fingerprint authentication fails in step S208, the processor 1110 may generate a screen, a sound effect, a vibration, or the like indicating a fingerprint authentication failure. In addition, when the fingerprint authentication is failed, the processor 1110 may request input of the password for the lock state release (S212). When the password input in step S212 matches a password which is input to the memory 1120 in advance (S214), the processor 1110 may release the lock state of the electronic device 1000 (S210).

When the password input in step S212 does not match the password which is input to the memory 1120 in advance (S214), the processor 1110 may display an image indicating an authentication failure on the display module 1140 (S216). Here, the image corresponding to the authentication failure may be variously set to include information corresponding to the authentication failure.

In the above-described embodiment of the disclosure, the processor 1110 performs the fingerprint authentication process only when a touch input is applied to the first fingerprint recognition icon 302a, and thus security of the electronic device 1000 may be increased.

Additionally, in an embodiment of the disclosure, two or more first fingerprint recognition icons 302a may be set. When the two or more first fingerprint recognition icons 302a are set, the processor 1110 may determine whether a multi-fingerprint touch in which the two or more first fingerprint recognition icons 302a are simultaneously selected is input as shown in FIG. 3C. For example, a user may use a first finger to touch a first one of the first fingerprint recognition icons 302a while using a second other finger to touch a second other one of the first fingerprint recognition icons 302a to achieve multi-fingerprint touch. The multi-fingerprint touch may also result when the touch of the first finger and the second finger occurs within a certain period of time. When the multi-fingerprint touch is input, the processor 1110 may perform the above-described fingerprint authentication process (for example, perform steps S204 to S216). The multi-fingerprint touch may mean a case where two or more fingers including fingerprint information simultaneously touch the display module 1140. When a plurality of first fingerprint recognition icons 302a are set, security of the electronic device 1000 may be further increased. For example, to be authenticated, a user might need to touch their index finger to a certain one of the first fingerprint recognition icons 302a and their middle finger to a different one of the fingerprint recognition icons 302a. Since other users do not have knowledge of which finger to touch to which icon 302a, this may increase security greatly.

Figure 4:
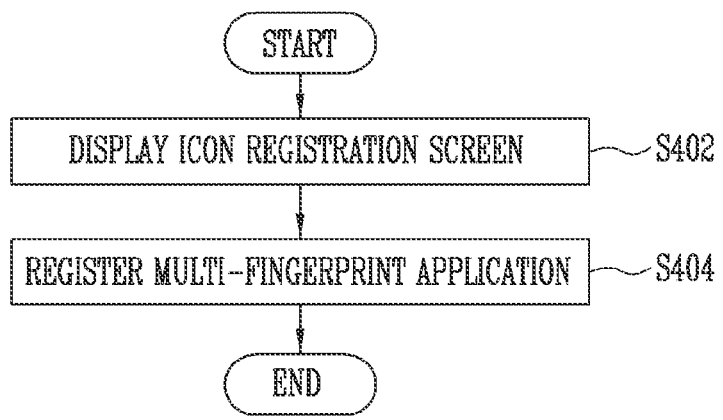
FIG. 4 is an embodiment illustrating a registration process of applications to be driven by a multi-fingerprint touch.
Figure 5:
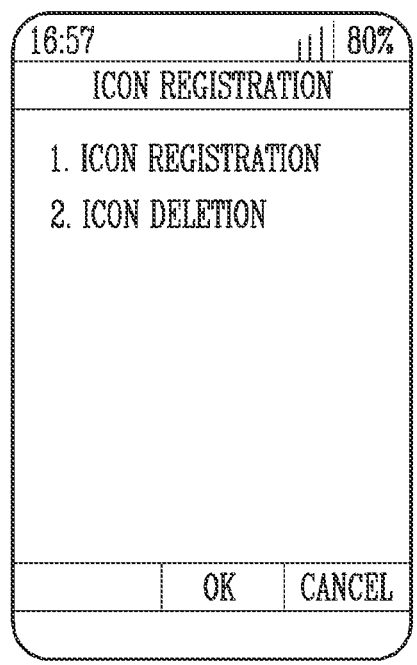
FIG. 5 is a diagram illustrating an embodiment of an image displayed on the display module in correspondence with a flowchart of FIG. 4.

FIG. 4 is an embodiment illustrating a registration process of applications to be driven by the multi-fingerprint touch. FIG. 5 is a diagram illustrating an embodiment of an image displayed on the display module in correspondence with a flowchart of FIG. 4.

Referring to FIG. 4, the applications to be driven by the multi-fingerprint touch (hereinafter, multi-fingerprint applications) may be registered in the memory 1120 in advance so that the multi-fingerprint applications may be operated only when the multi-fingerprint touch is input. In an embodiment, the processor 1110 executes the multi-fingerprint application only when the multi-fingerprint touch is input. For example, when the multi-fingerprint touch is input to the multi-fingerprint application, the processor 1110 may execute the corresponding application after the fingerprint authentication.

The multi-fingerprint applications may be set in advance by the user in consideration of security or the like, and, for example, may include at least one of a phone book, a call list, social network service (SNS) (for example, INSTAGRAM, TWITTER, FACEBOOK, and the like), a messenger (for example, KAKAOTALK, LINE, and the like), a gallery, and a memo application.

The processor 1110 may display a screen for icon registration (or application icon registration) as shown in FIG. 5 for multi-fingerprint application registration (S402). Application information selected in step S402 may be stored in the memory 1120 by the processor 1110 (S404). Thereafter, the processor 1110 may determine the multi-fingerprint application using information stored in the memory 1120.

Figure 6:
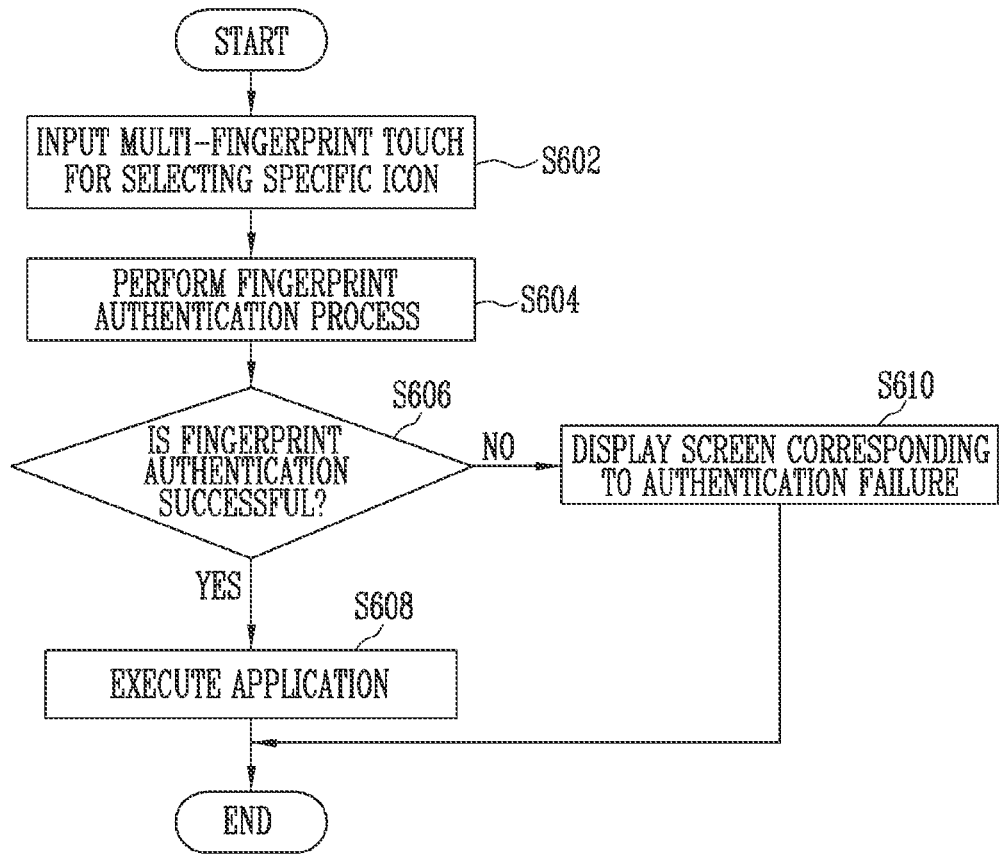
FIG. 6 is a flowchart illustrating a multi-fingerprint application execution process according to an embodiment of the disclosure.
Figure 7A:
FIGS. 7A and 7B are diagrams illustrating an embodiment of an image displayed on the display module in correspondence with the flowchart of FIG. 6.
Figure 7B:

FIG. 6 is a flowchart illustrating a multi-fingerprint application execution process according to an embodiment of the disclosure. FIGS. 7A and 7B are diagrams illustrating an embodiment of an image displayed on the display module in correspondence with the flowchart of FIG. 6.

Referring to FIG. 6, the processor 1110 monitors for a multi-fingerprint touch input and performs the fingerprint authentication process when the multi-fingerprint touch is input (S602 and S604).

In step S602, as shown in FIG. 7A, the multi-fingerprint touch may mean a case where an application icon is selected by a first fingerprint touch input (for example, one finger) and a background screen of the display module 1140 is selected by a second fingerprint touch input (for example, another finger). In an embodiment, when the multi-fingerprint touch is input in step S602, the processor 1110 may compare at least one fingerprint information of fingerprint information from the first fingerprint touch input and fingerprint information from the second fingerprint touch input with the fingerprint information stored in the memory 1120, and perform the fingerprint authentication process using a comparison result (S604). For example, the processor 1110 may compare first fingerprint information of the first fingerprint touch input with first stored fingerprint information to generate a first result, compare second fingerprint information of the second fingerprint touch input with second stored fingerprint information to generate a second result, and use the first and second results to perform the fingerprint authentication process.

In an embodiment, the processor 1110 may perform the fingerprint authentication process using the fingerprint information from the first fingerprint touch input. In an embodiment, the processor 1110 may perform the fingerprint authentication process using the fingerprint information from the second fingerprint touch input. In an embodiment, the processor 1110 may perform the fingerprint authentication process using the fingerprint information from the first fingerprint touch input and the fingerprint information from the second fingerprint touch input.

When the fingerprint information stored in the memory 1120 matches the fingerprint information obtained in the fingerprint authentication process and the fingerprint authentication process is successful (S606), the processor 1110 may execute a corresponding application (S608). That is, in an embodiment of the disclosure, when the multi-fingerprint touch is input in correspondence with the multi-fingerprint application, the multi-fingerprint application may be executed after the fingerprint authentication process.

When the fingerprint authentication fails in step S606, the processor 1110 may display a screen corresponding to the fingerprint authentication failure as shown in FIG. 7B and end the fingerprint authentication process (S610). However, the disclosure is not limited thereto since the processor 1110 may instead provide an audible sound that indicates the fingerprint authentication has failed.

Figure 8:
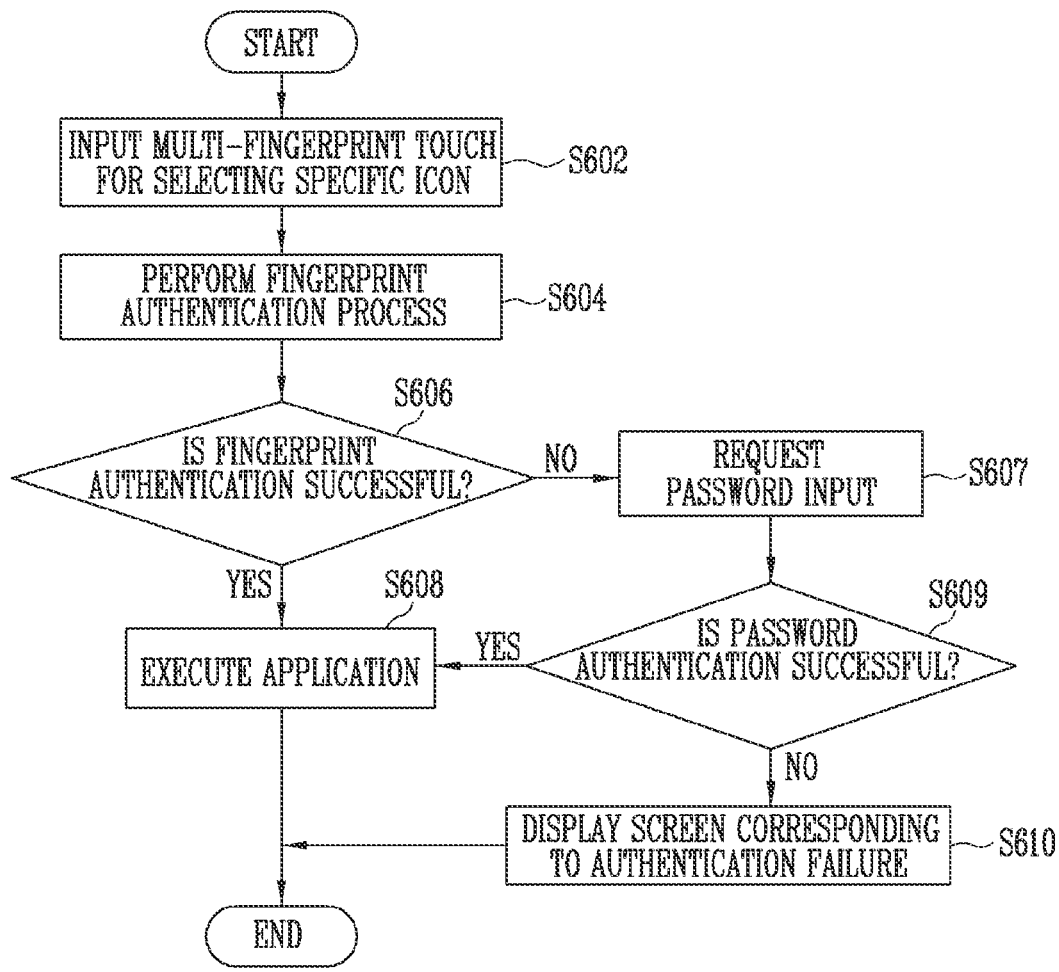
FIG. 8 is a flowchart illustrating an execution process of a multi-fingerprint application according to an embodiment of the disclosure.

FIG. 8 is a flowchart illustrating an execution process of a multi-fingerprint application according to an embodiment of the disclosure. When describing FIG. 8, the same reference numerals are assigned to the same portions as those in FIG. 6, and a detailed description thereof is omitted.

Referring to FIG. 8, when the fingerprint authentication fails in step S606, the processor 1110 may request a password input (S607). For example, the processor 1110 may present a graphical user interface that enables a user to enter a password. When the password input in step S607 matches the password stored to the memory 1120 in advance (S609), the processor 1110 may execute a corresponding application (S608).

When the password input in step S607 does not match the password which is stored to the memory 1120 in advance (S609), the processor 1110 displays an image indicating the authentication failure on the display module 1140 (S610), and ends the fingerprint authentication process.

Figure 10A:
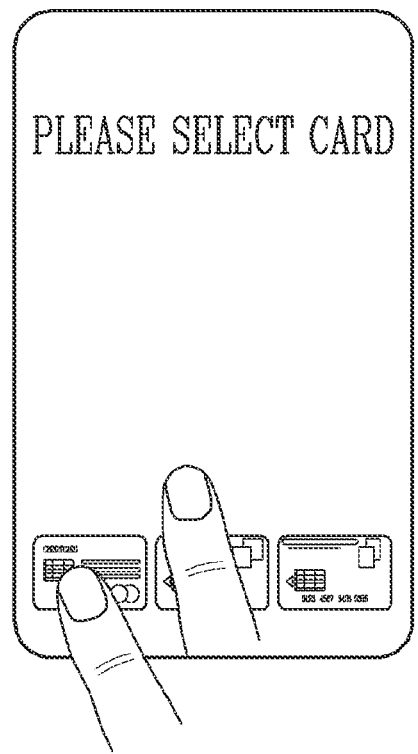
FIGS. 10A to 10C are diagrams illustrating an embodiment of an image displayed on the display module in correspondence with the flowchart of FIG. 9.
Figure 10B:
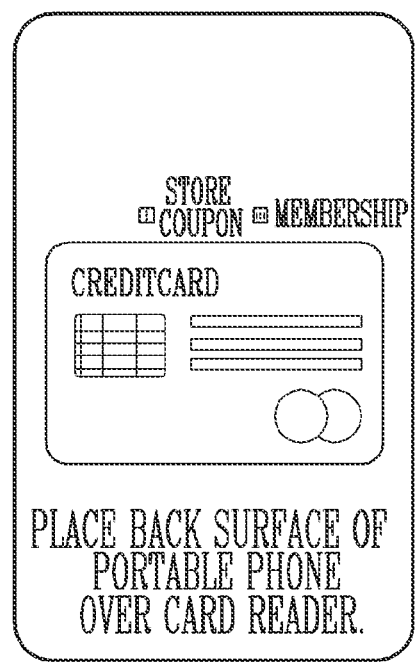
Figure 10C:
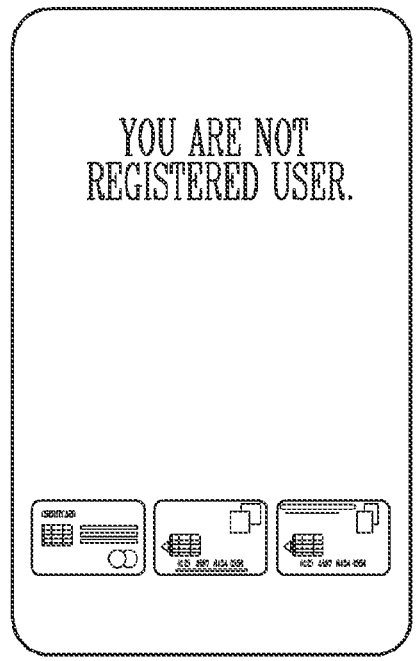

FIG. 9 is a flowchart illustrating an embodiment of a pay application execution process using the multi-fingerprint touch. FIGS. 10A to 10C are diagrams illustrating an embodiment of an image displayed on the display module in correspondence with the flowchart of FIG. 9.

Referring to FIG. 9, the processor 1110 executes the pay application in response to an input of the user (S900). For example, the processor 1110 may execute the pay application in response to a pay application icon touch of the user. For example, the processor 1110 may execute the pay application in response to a predetermined direction drag of the user. For example, a graphical user interface may be presented on the display panel 1141 illustrating a product or service for purchase and selectable button for making the purchase, and then selection of the button may start the pay application so it can then receive the multi-fingerprint touch input. For example, the processor 1110 may execute the pay application through the authentication process of FIG. 6 or 8 in response to the multi-fingerprint touch. In an embodiment, the pay application may include all applications capable of settling an account using the electronic device 1000.

After the pay application is executed, the processor 1110 monitors the multi-fingerprint touch input and performs the fingerprint authentication process when the multi-fingerprint touch is input (S902 and S904). In step S902, the processor 1110 may determine that the multi-fingerprint touch is input when the first fingerprint touch input selects a card icon and the second fingerprint touch input selects a background screen (or an empty space) of the display module 1140 as shown in FIG. 10A. When the multi-fingerprint touch is input in step S902, the processor 1110 may perform the fingerprint authentication process using the fingerprint information of the first fingerprint touch input and/or the fingerprint information of the second fingerprint touch input (S904). The location of the empty space may vary. For example, an authorized location of the empty space may be only known by an authorized user and thus selection of a location different from the authorized location may cause an authentication failure.

When the fingerprint information stored in the memory 1120 matches the fingerprint information obtained in the fingerprint authentication process and the fingerprint authentication process is successful (S906), the processor 1110 may set a card selected in the multi-fingerprint touch as a card to be used in the pay application. In this case, the processor 1110 may display a payment screen on the display module 1140 to enable payment using the selected card as shown in FIG. 10B (S908). For example, a user may place their mobile device near a card reader of the electronic device 1000 after the payment screen is displayed to initiate payment.

Since the card to be used in the pay application is authenticated in the multi-fingerprint touch process, an additional authentication process may be omitted in a payment process. That is, in an embodiment of the disclosure, in a process of selecting the card to be used in the pay application, the card may be selected and the fingerprint authentication process may be performed using the multi-fingerprint touch, and thus additional authentication may be omitted.

When the fingerprint authentication fails in step S906, the processor 1110 may display a screen indicating the authentication failure on the display module 1140 as shown in FIG. 10C (S910). In addition, the processor 1110 may end the pay application when the fingerprint authentication has failed one or more times. A user may be allowed a certain number of attempts of using two fingers to achieve the multi-fingerprint touch input. For example, the fingerprint authentication may fail when this certain number has been reached and none of the attempted multi-fingerprint touch inputs matches pre-stored information.

Figure 11:
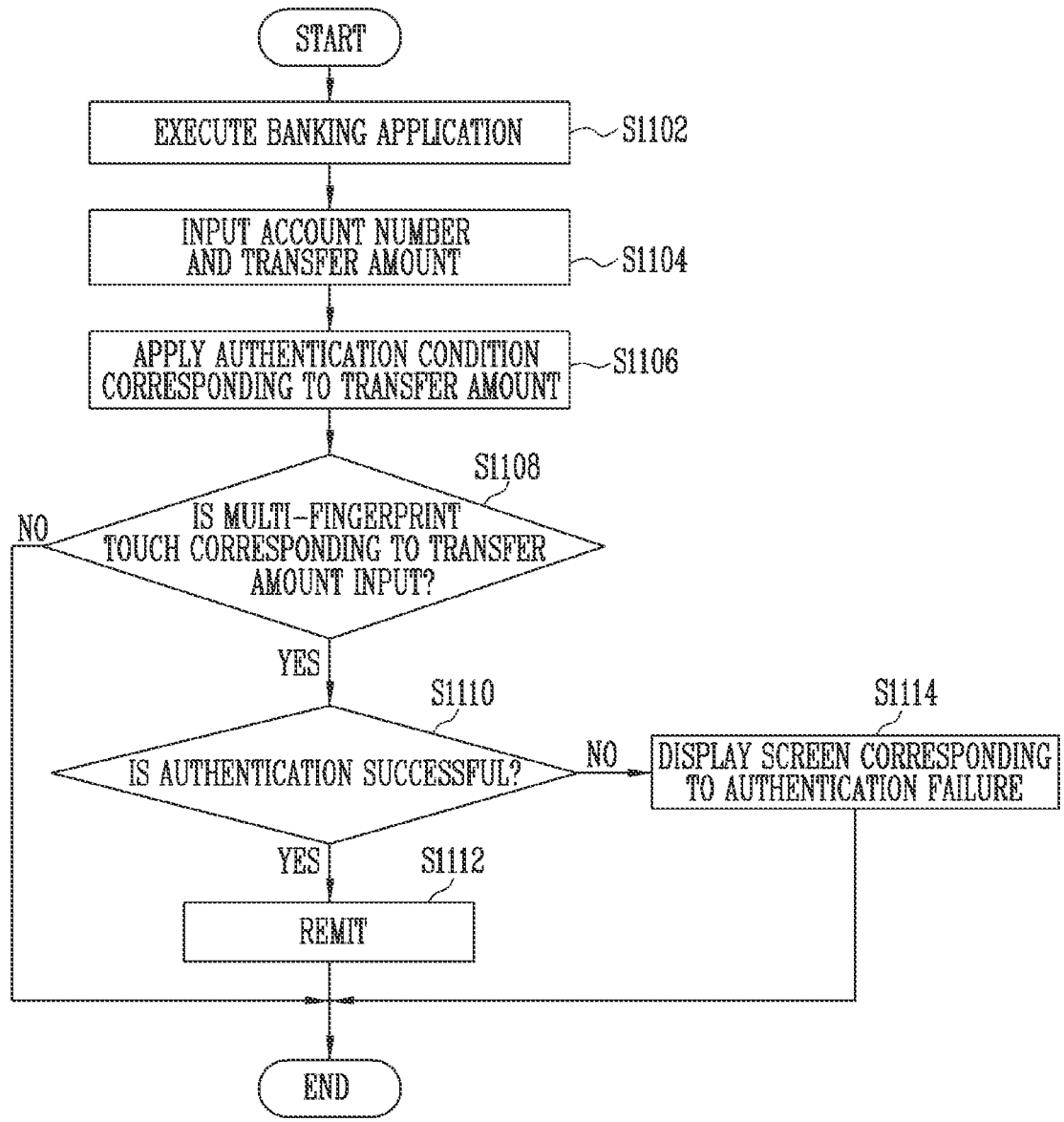
FIG. 11 is a flowchart illustrating an embodiment of a process of controlling a banking application using the multi-fingerprint touch.
Figure 12A:
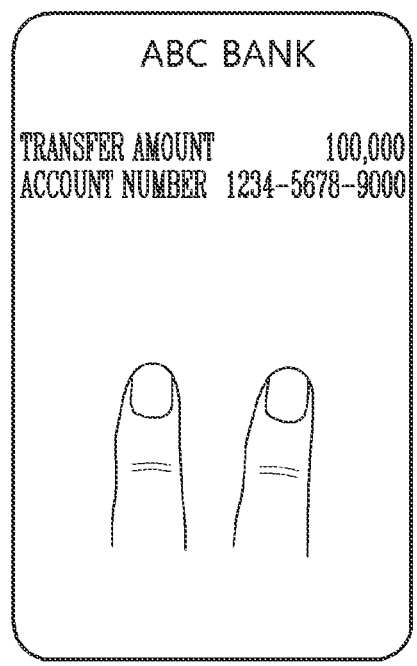
FIGS. 12A and 12B are diagrams illustrating an embodiment of an image displayed on the display module in correspondence with the flowchart of FIG. 11.
Figure 12B:
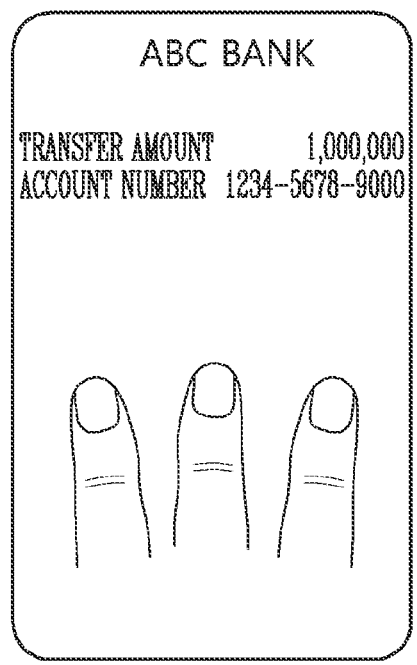

FIG. 11 is a flowchart illustrating an embodiment of a process of controlling a banking application using the multi-fingerprint touch. FIGS. 12A and 12B are diagrams illustrating an embodiment of an image displayed on the display module in correspondence with the flowchart of FIG. 11.

Referring to FIG. 11, the processor 1110 executes the banking application in response to an input of the user (S1102). For example, the processor 1110 may execute the banking application in response to a touch of the user on the banking application icon. For example, the processor 1110 may execute the banking application through the authentication process of FIG. 6 or 8 in response to the multi-fingerprint touch. In an embodiment, the banking application may include all applications capable of remitting a predetermined amount.

After the banking application is executed, the processor 1110 may receive a predetermined transfer amount and account information corresponding thereto from the user (S1104). For example, if the user places their mobile device near a card reader, the banking application could automatically extract a credit/debit card number stored by the mobile device and the transfer amount from communications between the mobile device and the card reader. The processor 1110 may apply an authentication condition to the transfer amount (S1106). For example, the processor 1110 receiving the transfer amount from S1104 may set an authentication condition differently in response to the transfer amount. For example, the processor 1110 may differently set the number of fingers (or the number of fingerprints) used for authenticating the multi-fingerprint touch in response to the transfer amount.

In an embodiment, the processor 1110 performs fingerprint authentication using two fingerprints when the transfer amount is equal to or less than a predetermined amount (for example, 100,000 won) as shown in FIG. 12A. In an embodiment, the processor 1110 may perform the fingerprint authentication using three fingerprints when the transfer amount exceeds the predetermined amount as shown in FIG. 12B. That is, in an embodiment of the disclosure, the processor 1110 may differently set the number of fingers (or the number of fingerprints) used for the fingerprint authentication in response to a transferred amount in the banking application, and thus may increase security. Further, since a lesser number of fingers or fingerprints may be used for lessor transfer amounts, both security and convenience can be optimized.

The processor 1110 determines whether a multi-fingerprint touch corresponding to the authentication condition set in step S1106 is input (S1108). The processor 1110 may end the banking application when a multi-fingerprint touch which does not correspond to the authentication conditions is input (that is, when does not correspond to the number of fingerprints set in the authentication condition). Further, a certain number of attempts may allowed before concluding that the multi-fingerprint touch has not been input.

When the multi-fingerprint touch corresponding to the authentication condition is input, the processor 1110 may compare the fingerprint information stored in the memory 1120 with the fingerprint information input from the multi-fingerprint touch, and when the fingerprint authentication process is successful (S1110), the processor 1110 may remit a corresponding amount (S1112). When the fingerprint authentication has failed in step S1110, the processor 1110 may display the screen indicating the authentication failure on the display module 1140 and then end the banking application (S1114).

In the above-described embodiment of the disclosure, when a predetermined amount of money is sent using the banking application, the authentication process may be performed using a different numbers of fingerprint information in correspondence with the transfer amount, and thus security may be increased.

Figure 13:
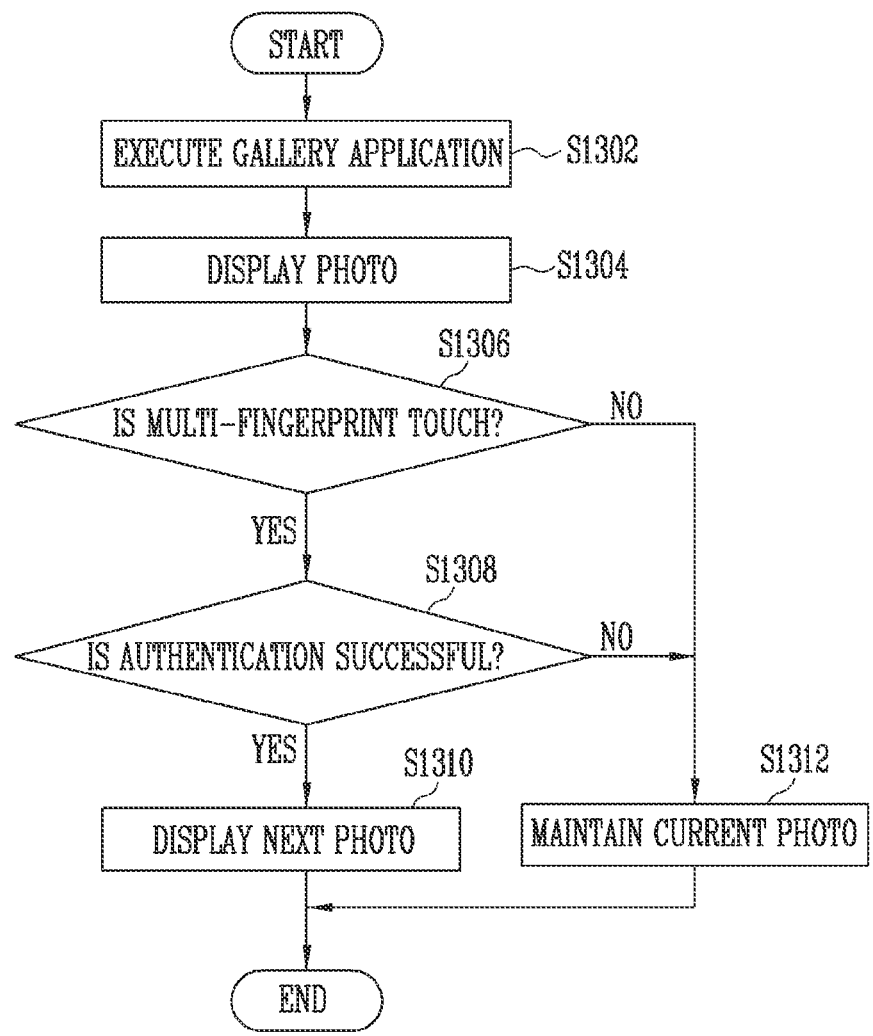
FIG. 13 is a flowchart illustrating an embodiment of a process of controlling a gallery application using the multi-fingerprint touch.
Figure 14:
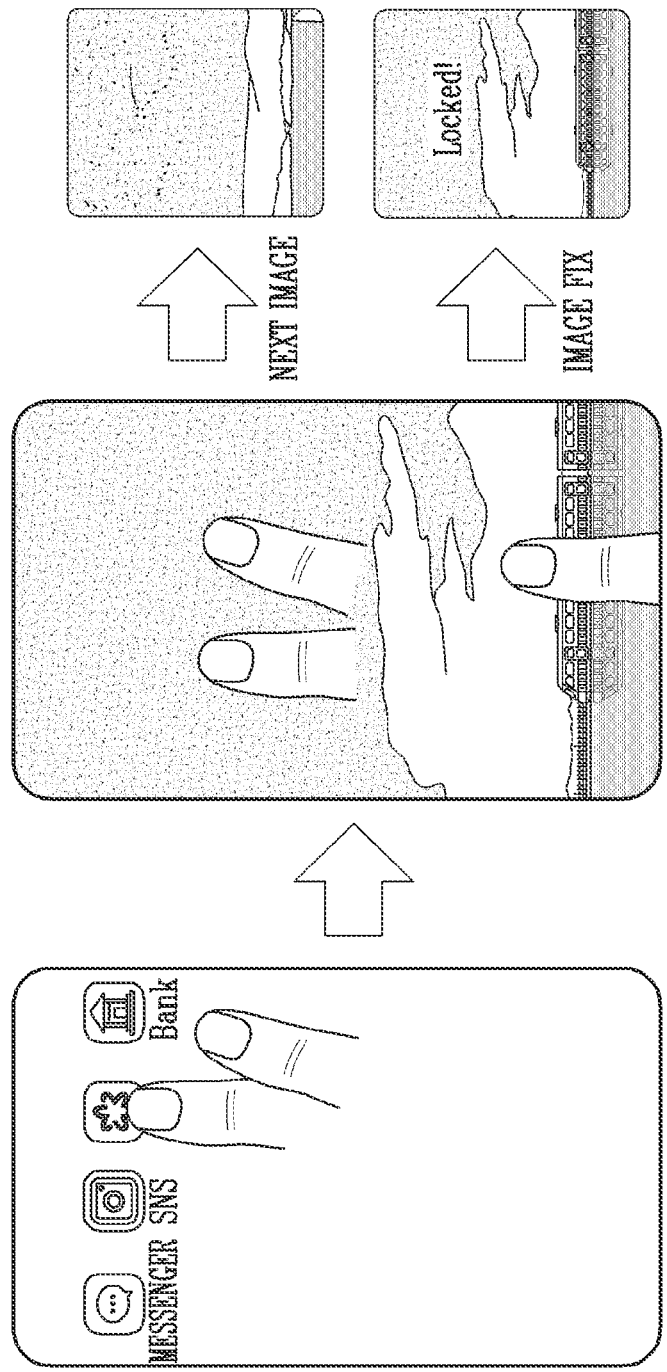
FIG. 14 is a diagram illustrating an embodiment of an image displayed on the display module in correspondence with the flowchart of FIG. 13.

FIG. 13 is a flowchart illustrating an embodiment of a process of controlling a gallery application using the multi-fingerprint touch. FIG. 14 is a diagram illustrating an embodiment of an image displayed on the display module in correspondence with the flowchart of FIG. 13.

Referring to FIG. 13, the processor 1110 executes a gallery application in response to the input of the user (S1302). For example, the processor 1110 may execute the gallery application in response to a touch by a user on a gallery application icon. For example, as shown in FIG. 14, the processor 1110 may execute the gallery application through the authentication process of FIG. 6 or 8 in response to the multi-fingerprint touch. In an embodiment, the gallery application may include all applications showing an image (a photo, a drawing, and the like).

When the gallery application is executed, a predetermined photo may be displayed on the display module 1140 (S1304). After the predetermined photo is displayed on the display module 1140, the processor 1110 may determine whether the multi-fingerprint touch is input (S1306). In step S1306, when the multi-fingerprint touch is not input or only one finger is touched, the processor 1110 may maintain a current display screen (for example, a current photo) (S1312).

When the multi-fingerprint touch is input in step S1306, the processor 1110 may compare the fingerprint information of the fingers used for the multi-fingerprint touch with the fingerprint information stored in the memory 1120, and when the fingerprint authentication process is successful (S1308), the processor 1110 may display a next photo on the display module 1140. When the fingerprint authentication has failed in step S1308, the processor 1110 may maintain the current display screen (S1312). In this way, an unauthorized user may be denied access to images of another user. In an embodiment, S1304 is omitted, and no image is displayed until the fingerprint authentication process is successful.

In the above-described embodiment of the disclosure, security of the electronic device 1000 may be increased by applying the multi-fingerprint touch to the gallery application. For example, the user may show a current photo to another user after executing the gallery application. In an embodiment, even though the other user touches with one finger or a plurality of fingers, the next photo may not be displayed on the display module 1140, and thus a user's unwanted photo may be prevented from being shown to the other user. For example, as shown in FIG. 14, a next image after the current image may be displayed if a first user applies a valid multi-touch fingerprint input, but the current image may be maintained or fixed if a second user later touches the screen.

Although the above has been described with reference to the embodiments of the disclosure, those skilled in the art will understand that the disclosure may be variously modified and changed without departing from the spirit and scope of the disclosure.

What is claimed is:

1. A method of driving an electronic device, the method comprising:
    displaying at least one first fingerprint recognition icon and at least one second fingerprint recognition icon on a display device while the display device is in a lock state;
    determining whether a touch input has been received from the at least one first fingerprint recognition icon or the at least one second fingerprint recognition icon;
    when it is determined that the touch input has been received from the at least one first fingerprint recognition icon,
        performing a fingerprint authentication process to determine whether fingerprint information of the touch input is authentic and releasing the lock state of the display device when it is determined the fingerprint information is authentic; and
    when it is determined that the touch input has been received from the at least one second fingerprint recognition icon,
        maintaining the lock state without performing the fingerprint authentication process.

2. The method according to claim 1, further comprising:
    receiving a password to release the lock state when the fingerprint authentication process determines the fingerprint information is not authentic.

3. The method according to claim 1, wherein the releasing comprises releasing the lock state when a multi-fingerprint touch in which two or more of the at least one first fingerprint recognition icon are simultaneously selected is input.

4. The method according to claim 1, further comprising:
    displaying application icons on the display device;
    receiving a multi-fingerprint touch including a first fingerprint touch input for selecting one of the application icons and a second fingerprint touch input for selecting a background screen of the display device;
determining whether the fingerprint information input from at least one of the first fingerprint touch input and the second fingerprint touch input is authentic; and
executing an application of the application icon selected by the first fingerprint touch input when the fingerprint information is determined to be authentic.

5. The method according to claim 4, further comprising:
receiving a password to execute the application of the selected application icon when the fingerprint information is not authentic.

6. The method according to claim 1, further comprising:
executing a pay application;
receiving a multi-fingerprint touch including a first fingerprint touch input for selecting one of a plurality of cards included in the pay application and a second fingerprint touch input for selecting a background screen of the display device;
determining whether the fingerprint information input from at least one of the first fingerprint touch input and the second fingerprint touch input is authentic; and
using the selected a card for performing a purchase.

7. The method according to claim 6, the using of the selected card for performing the purchase occurs without performing an additional authentication step.

8. The method according to claim 1, further comprising:
executing a banking application;
receiving a transfer amount;
determining an authentic condition among a plurality of different authentication conditions in response to the transfer amount; and
remitting the transfer amount when it is determined that the fingerprint information is authentic and the transfer amount satisfies the authentic condition.

9. The method according to claim 8, wherein a number of fingerprints to be used for the fingerprint authentication process increases in response to an increase of the transfer amount.

10. The method according to claim 9, wherein the fingerprint information is input as a multi-fingerprint touch in which a plurality of fingers are simultaneously touched.

11. The method according to claim 1, further comprising:
executing a gallery application for displaying a current image on the display device;
receiving a multi-fingerprint touch including a first fingerprint touch input and a second fingerprint touch input; and
determining whether the fingerprint information input from at least one of the first fingerprint touch input and the second fingerprint touch input is authentic; and
displaying a next image on the display device when the fingerprint information is determined to be authentic.

12. The method according to claim 11, further comprising: maintaining the current image displayed on the display device when the multi-fingerprint touch is not input.

13. The method according to claim 11, further comprising:
maintaining the current image displayed on the display device when the fingerprint information is not authentic.

14. An electronic device comprising:
a fingerprint sensor for sensing a fingerprint when a display device is touched; and
a processor for displaying at least one first fingerprint recognition icon and at least one second fingerprint recognition icon on the display device while the display device is in a lock state and determining whether a touch input has been received from the at least one first fingerprint recognition icon or the at least one second fingerprint recognition icon,
when it is determined that the touch input has been received from the at least one first fingerprint recognition icon, the processor performs a fingerprint authentication process to determine whether fingerprint information of the touch input is authentic and releases the lock state of the display device when it is determined the fingerprint information is authentic; and
when it is determined that the touch input has been received from the at least one second fingerprint recognition icon, the processor maintains the lock state without performing the fingerprint authentication process.

15. The electronic device according to claim 14, wherein after the lock state is released, a plurality of application icons are displayed on the display device, and when a multi-fingerprint touch including a first fingerprint touch input for selecting one of the application icons and a second fingerprint touch input for selecting a background screen of the display device is input, the processor authenticates the fingerprint information input from at least one of the first fingerprint touch input and the second fingerprint touch input and then executes the application icon selected by the first fingerprint touch input.

16. The electronic device according to claim 14, wherein when a multi-fingerprint touch including a first fingerprint touch input for selecting one of a plurality of cards and a second fingerprint touch input for selecting a background screen of the display device is input after a pay application is executed, the processor authenticates the fingerprint information input from at least one of the first fingerprint touch input and the second fingerprint touch input and uses a card selected by the first fingerprint touch input to perform a purchase.

17. The electronic device according to claim 16, wherein the processor performs the purchase using the selected card without an additional authentication process.

18. The electronic device according to claim 14, wherein the processor applies different authentication conditions to the fingerprint authentication process according to a transfer amount when a banking application is executed.

19. The electronic device according to claim 18, wherein the processor performs the authentication process using the fingerprint information of a first number of fingers when the transfer amount is a first value and using the fingerprint information of a second number of fingers larger than the first number when the transfer amount is a second value larger than the first value.

20. The electronic device according to claim 14, wherein the processor authenticates the fingerprint information and then displays a next image when a multi-fingerprint touch including a first fingerprint touch input and a second fingerprint touch input is input after a gallery application is executed and a current image is displayed on the display device.

* * * * *